(12) United States Patent
Ooi et al.

(10) Patent No.: US 9,426,406 B2
(45) Date of Patent: Aug. 23, 2016

(54) DISPLAY DEVICE AND CONTROL METHOD

(75) Inventors: Junji Ooi, Tokyo (JP); Yusuke Sakai, Kanagawa (JP); Shingo Tsurumi, Saitama (JP); Tomohiko Gotoh, Kanagawa (JP); Yuichi Iida, Tokyo (JP); Shinichi Hayashi, Gifu (JP); Junichi Tsukamoto, Kanagawa (JP); Asako Tadenuma, Tokyo (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 13/124,987

(22) PCT Filed: Aug. 25, 2010

(86) PCT No.: PCT/JP2010/064372
§ 371 (c)(1),
(2), (4) Date: Jun. 29, 2011

(87) PCT Pub. No.: WO2011/027696
PCT Pub. Date: Mar. 10, 2011

(65) Prior Publication Data
US 2011/0254691 A1  Oct. 20, 2011

(30) Foreign Application Priority Data

Sep. 7, 2009  (JP) ................................. 2009-205997

(51) Int. Cl.
*G09G 5/10* (2006.01)
*H04N 5/63* (2006.01)

(52) U.S. Cl.
CPC .................. *H04N 5/63* (2013.01); *G09G 5/10* (2013.01); *G09G 2330/021* (2013.01); *G09G 2330/022* (2013.01); *G09G 2354/00* (2013.01)

(58) Field of Classification Search
CPC ...... G01R 31/343; G06K 9/00; G06F 3/016; G06F 3/0421; H04N 5/4401
USPC .......... 340/635; 345/176; 382/181, 185–189; 715/780, 863
See application file for complete search history.

(56) References Cited

U.S. PATENT DOCUMENTS 6,665,805 B1 * 12/2003 Tsirkel et al. .................. 713/323
7,117,380 B2 * 10/2006 Kangas .......................... 713/320
(Continued)

FOREIGN PATENT DOCUMENTS

EP  2 000 881 A1  12/2008
JP  09 037187  2/1997
(Continued)

OTHER PUBLICATIONS

International Search Report issued Oct. 19, 2010 in PCT/JP10/64372 filed Aug. 25, 2010.
(Continued)

*Primary Examiner* — Mohamed Barakat
(74) *Attorney, Agent, or Firm* — Oblon, McClelland, Maier & Neustadt, L.L.P.

(57) ABSTRACT

Provided is a display device including an imaging unit that captures a moving image in a predetermined range in an image display direction, a moving body detection unit that detects whether or not a moving body is present in a predetermined range in the image display direction, an image analysis unit that analyzes the moving image captured by the imaging unit to detect whether or not a face is present, and a power control unit that controls power consumption with different patterns according to a plurality of modes that are set by combining whether or not the face detected by the image analysis unit is present and whether or not the moving body detected by the detection unit is present.

14 Claims, 10 Drawing Sheets

(56) References Cited

U.S. PATENT DOCUMENTS

| | | | |
|---|---|---|---|
| 7,415,191 B2* | 8/2008 | Sako et al. | 386/248 |
| 7,514,703 B2* | 4/2009 | Iwakiri | 250/584 |
| 2005/0222801 A1* | 10/2005 | Wulff et al. | 702/141 |
| 2006/0192775 A1 | 8/2006 | Nicholson et al. | |
| 2007/0126884 A1* | 6/2007 | Xu et al. | 348/220.1 |
| 2008/0016544 A1* | 1/2008 | Lee et al. | 725/134 |
| 2008/0111830 A1* | 5/2008 | Liu et al. | 345/619 |
| 2008/0118152 A1* | 5/2008 | Thorn et al. | 382/190 |
| 2008/0204443 A1* | 8/2008 | Morimoto | G09G 3/3406 345/211 |

FOREIGN PATENT DOCUMENTS

| | | |
|---|---|---|
| JP | 11 288259 | 10/1999 |
| JP | 2008 111886 | 5/2008 |
| JP | 2008111886 A * | 5/2008 |
| JP | 2008 244917 | 10/2008 |

OTHER PUBLICATIONS

Extended European Search Report issued Sep. 30, 2011, in European Patent Application No. 10813645.8.

U.S. Appl. No. 13/395,035, filed Mar. 8, 2012, Iida, et al.

* cited by examiner

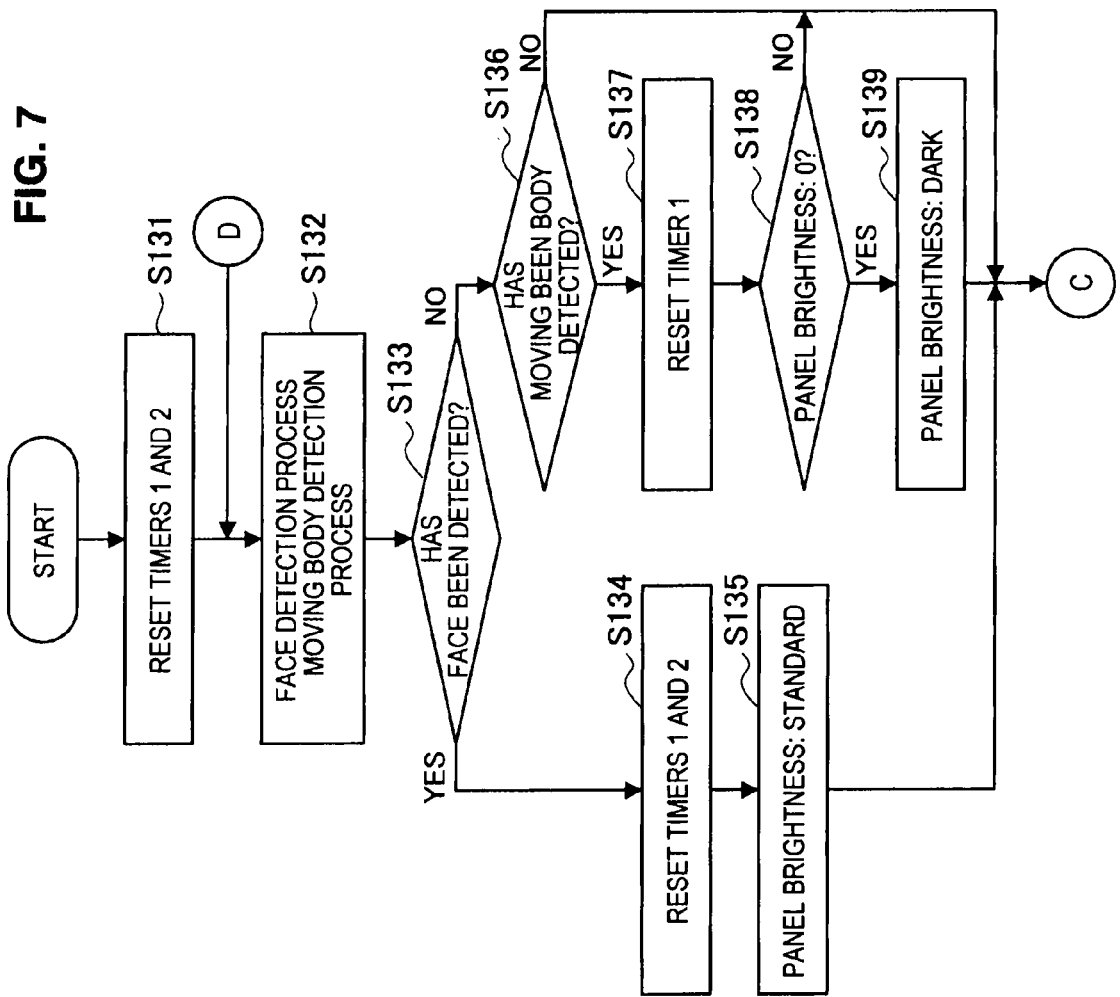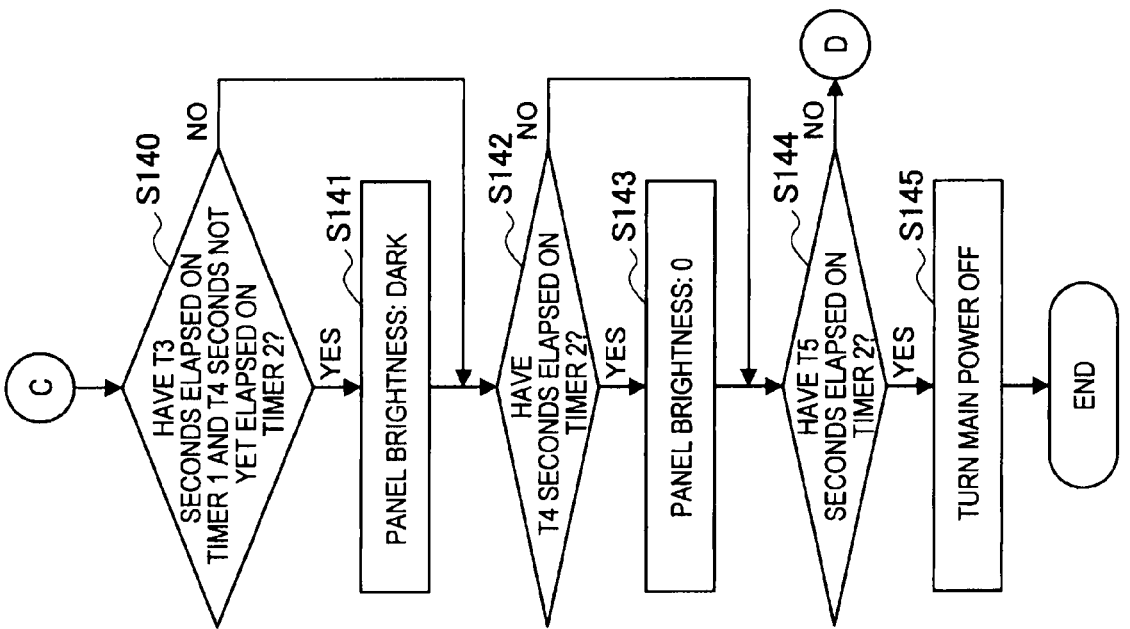

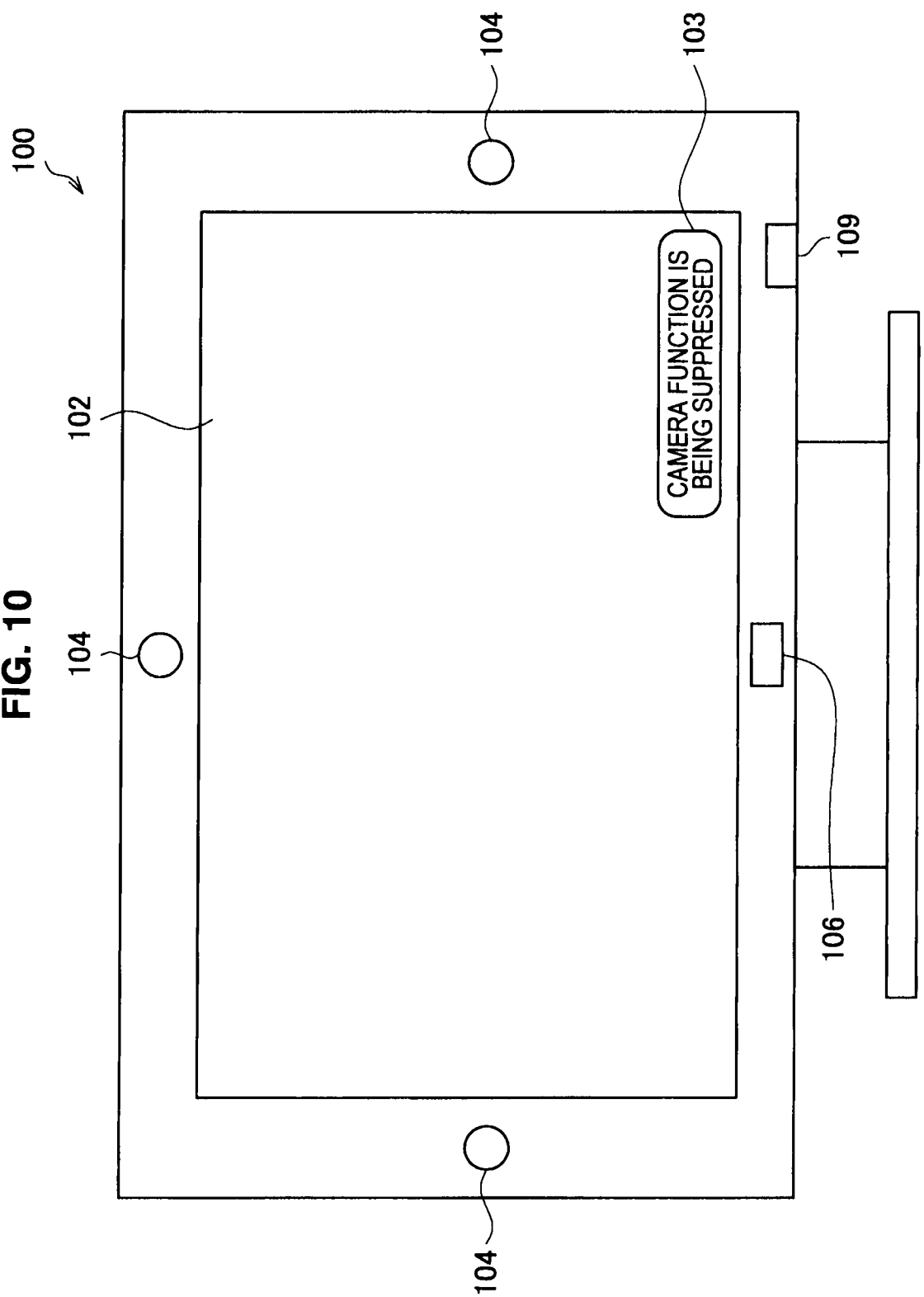

DISPLAY DEVICE AND CONTROL METHOD

TECHNICAL FIELD

The present invention relates to a display device and a control method.

BACKGROUND ART

According to the survey of Japan Electronics and Information Technology Industries Association (JEITA), an average television viewing time per day is 4.5 hours. However, it has been found that a television is not viewed continuously during the 4.5 hours due to recent changes in lifestyle.

For example, when viewing the television while preparing to go to work or school in the morning or while having a meal, a screen of the television may not be continuously viewed. Further, when a program that is sufficient by an input from a voice such as a weather forecast is being broadcasted, viewers may not look at the screen, or may have a conversation with another person. Then, a behavior of beginning to view the screen of the television again due to an interesting keyword running in topical news or sports news is frequently done.

That is, as a representative television viewing form, the television is turned on instead of a clock in the morning, and "simultaneous viewing" of listening to a sound of the television while operating a personal computer (PC) at night has recently increased. When "simultaneous viewing" is performed, power is unnecessarily expended in a state in which the screen of the television is turned on. For this reason, a display device in which an imaging device is installed around the television screen, and power save control optimal for a viewing state is executed by performing face detection through the image device and analyzing a user's viewing state has been proposed.

SUMMARY OF INVENTION

Technical Problem

However, in the power save control using only face detection, there has been a problem in that even when it is desired to continuously view the display device, for example, when it is difficult to detect the user's face due to an installation environment of the television or when the user looks away during a certain time period, it is ultimately judged that viewing, that is, the face, is not present, and thus the display is turned off. Further, since the face detection process requires a relatively long image processing time compared to moving body detection, in an environment in which a computation rate or a resource is restricted, there has been a problem in that a response from when the user comes in front of the display device for viewing to when the image is displayed is delayed.

Further, there is a display device in which power save control is performed by detecting a moving body or the user's action through an imaging device or a pyroelectric infrared element and analyzing the user's viewing state. However, there has been a problem in that when the user keeps viewing without moving, it is erroneously judged that the user is not present, and the screen display is turned off. In order to avoid such a malfunction, it is necessary to increase a time until the power save control starts, which in turn deteriorates a power save effect.

The present invention is made in view of the above-mentioned issues, and aims to provide a display device and a control method which are novel and improved, and which are capable of efficiently executing the power save control with a high degree of accuracy by combining the user's moving body detection and face detection.

Solution to Problem

According to an aspect of the present invention in order to achieve the above-mentioned object, there is provided a display device including an imaging unit that captures a moving image in a predetermined range in an image display direction, a moving body detection unit that detects whether or not a moving body is present in a predetermined range in the image display direction, an image analysis unit that analyzes the moving image captured by the imaging unit to detect whether or not a face is present, and a power control unit that controls power consumption with different patterns according to a plurality of modes that are set by combining whether or not the face detected by the image analysis unit is present and whether or not the moving body detected by the detection unit is present.

The power control unit may have a first mode in which power consumption of the display device is controlled only according to whether or not the face detected by the image analysis unit is present, and when the image analysis unit has not been able to detect the presence of the face during a predetermined time, power consumption decreases.

The power control unit may have a second mode in which power consumption of the display device is controlled using whether or not the face detected by the image analysis unit is present and whether or not the moving body detected by the moving body detection unit is present, power consumption decreases up to a predetermined level when the image analysis unit has not been able to detect the presence of the face during a first predetermined time, and, after the decrease, power consumption further decreases when the moving body detection unit has not been able to detect the presence of the moving body during a second predetermined time.

The power control unit may have a third mode in which power consumption is controlled using whether or not the face detected by the image analysis unit is present and whether or not the moving body detected by the moving body detection unit is present, and when the image analysis unit has not been able to detect the presence of the face during a predetermined time and the moving body detection unit has not been able to detect the presence of the moving body during the predetermined time, power consumption decreases.

The power control unit may control power consumption of the display device by increasing or decreasing brightness of a display panel that display an image.

The power control unit may control power consumption of the display device by increasing or decreasing a sound volume of a speaker that display a voice.

The power control unit may control power consumption of the display device by controlling an operation of a circuitry configured to increase an image quality of a display image.

The display device may further include a notification unit that notifies that control of power consumption is stopped when the power control unit stops control of power consumption of the display device.

The image analysis unit may specify an individual through analysis on the moving image captured by the imaging unit, and the power control unit may automatically select the mode corresponding to the individual specified by the image analysis unit.

The power control unit may automatically select the mode corresponding to the details of content to be displayed.

The power control unit may not start control of power consumption of the display device until the face or the moving body is first detected after power is turned on.

According to another aspect of the present invention in order to achieve the above-mentioned object, there is provided a control method including an imaging step of capturing a moving image in a predetermined range in an image display direction, a moving body detection step of detecting whether or not a moving body is present in a predetermined range in the image display direction, a face detection step of analyzing the captured moving image to detect whether or not a face is present, and a power control step of controlling power consumption with different patterns according to a plurality of modes by combining whether or not the face is present and whether or not the moving body is present.

Advantageous Effects of Invention

As described above, according to the present invention, a display device and a control method which are novel and improved, and which are capable of efficiently executing the power save control with a high degree of accuracy by combining the user's moving body detection and face detection can be provided.

BRIEF DESCRIPTION OF DRAWINGS

FIG. 7 is a flowchart illustrating a power save operation of the image display device 100.

FIG. 10 is an explanation diagram illustrating an operation example of the image display device 100 when a power mode is intentionally being suppressed.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, a description will be made in the following order:
<1. Embodiment of the Present Invention>
[1-1. Configuration of Image Display Device]
[1-2. Configuration of Control Unit]
[1-3. Power Save Process]
<2. Summary>
<1. Embodiment of the Present Invention>
[1-1. Configuration of Image Display Device]

Figure 1:
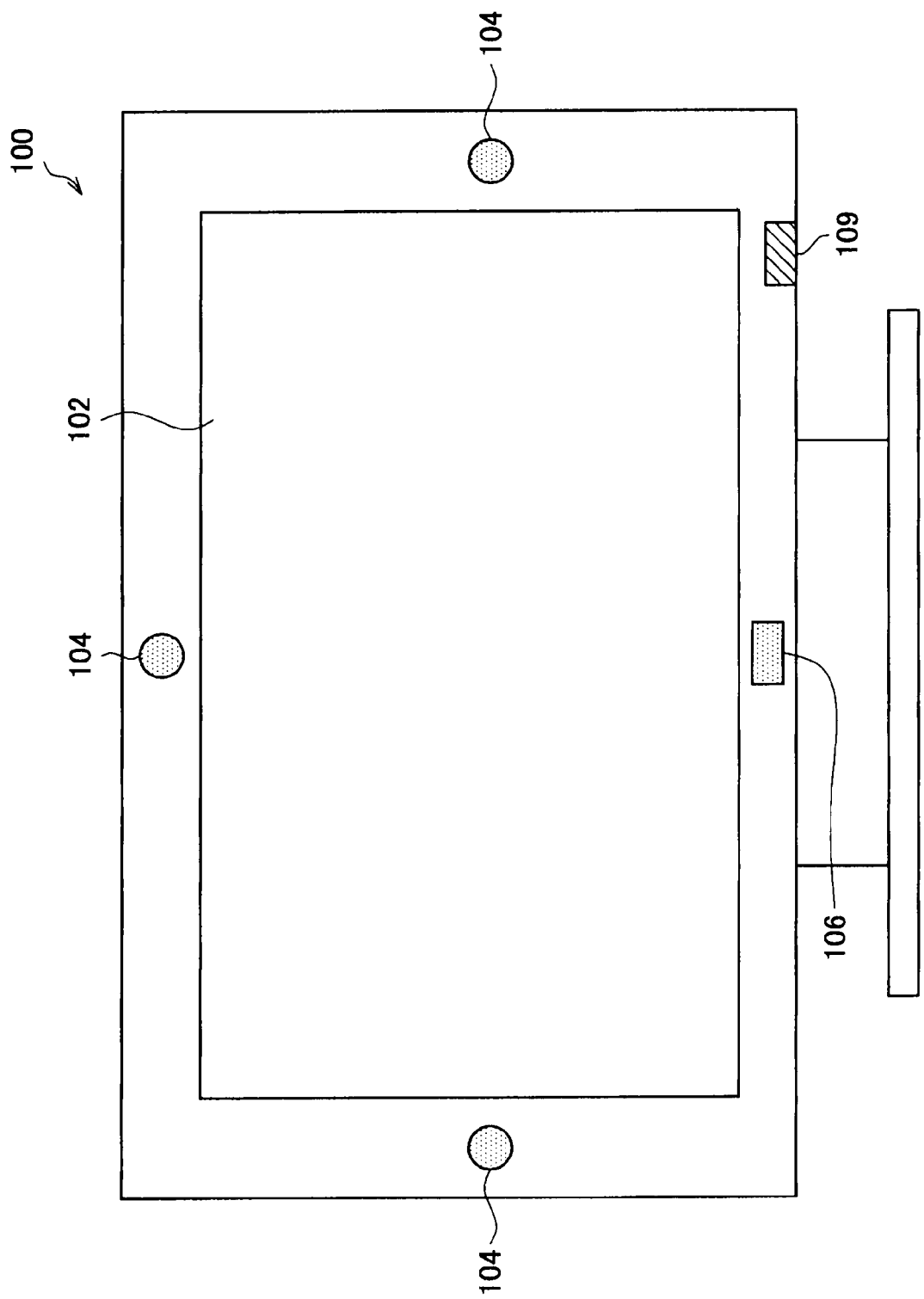
FIG. 1 is an explanation diagram for explaining an appearance of an image display device according to an embodiment of the present invention.

First, a configuration of an image display device according to an embodiment of the present invention will be described. FIG. 1 is an explanation diagram for explaining an appearance of an image display device 100 according to an embodiment of the present invention. FIG. 1 is a front view in which the image display device 100 is viewed from the front. An appearance of the image display device 100 according to an embodiment of the present invention will be described below with reference to FIG. 1.

As illustrated in FIG. 1, the image display device 100 according to an embodiment of the present invention includes an imaging unit 104, which captures a moving image, disposed in an upper-central part and left and right central parts of a display panel 102 that displays a still image or a moving image. The imaging unit 104 captures the moving image in a direction in which the image display device 100 displays the still image or the moving image through the display panel 102. The image display device 100 according to the present embodiment analyzes an image captured by the imaging unit 104 and detects a user's face reflected on the image. The image display device 100 is characterized in that its internal operation state changes depending on whether or not the user's face is included in the image captured by the imaging unit 104.

Further, the image display device 100 according to an embodiment of the present invention includes a sensor 106 disposed in a lower central part of the display panel 102. The sensor 106 detects whether or not a person is present in front of the image display device 100. The image display device 100 is also characterized in that its internal operation state changes depending on whether or not a person is present in front of the image display device 100.

Further, the image display device 100 according to an embodiment of the present invention includes a light emitting diode (LED) 109. The LED 109 notifies the user of a status of the image display device 100 through a lighting status or an emission color.

Further, in the image display device 100 illustrated in FIG. 1, the imaging unit 104 that captures the moving image is disposed at three positions around the display panel 102 of the image. It should be understood that in the present invention, an image input position at which the moving image is captured is not limited to the example. For example, a device separate from the image display device 100 may be disposed, the corresponding device may be connected with the image display device 100, and the moving picture may be captured by the corresponding device. Further, it should be understood that the number of image input units is not limited to three, and two or fewer or four or more image input units may be disposed to capture an image. Further, it should be understood that the number of the sensors 106 is not limited to one, and two or more sensors may be disposed to detect the presence of a person.

Further, although not shown in FIG. 1, the image display device 100 may further include a signal reception unit that can receive a control signal from a remote controller (not shown) in an infrared ray manner, a wireless manner, or the like.

The appearance of the image display device 100 according to an embodiment of the present invention has been described above with reference to FIG. 1. Next, a configuration of the image display device 100 according to an embodiment of the present invention will be described.

Figure 2:
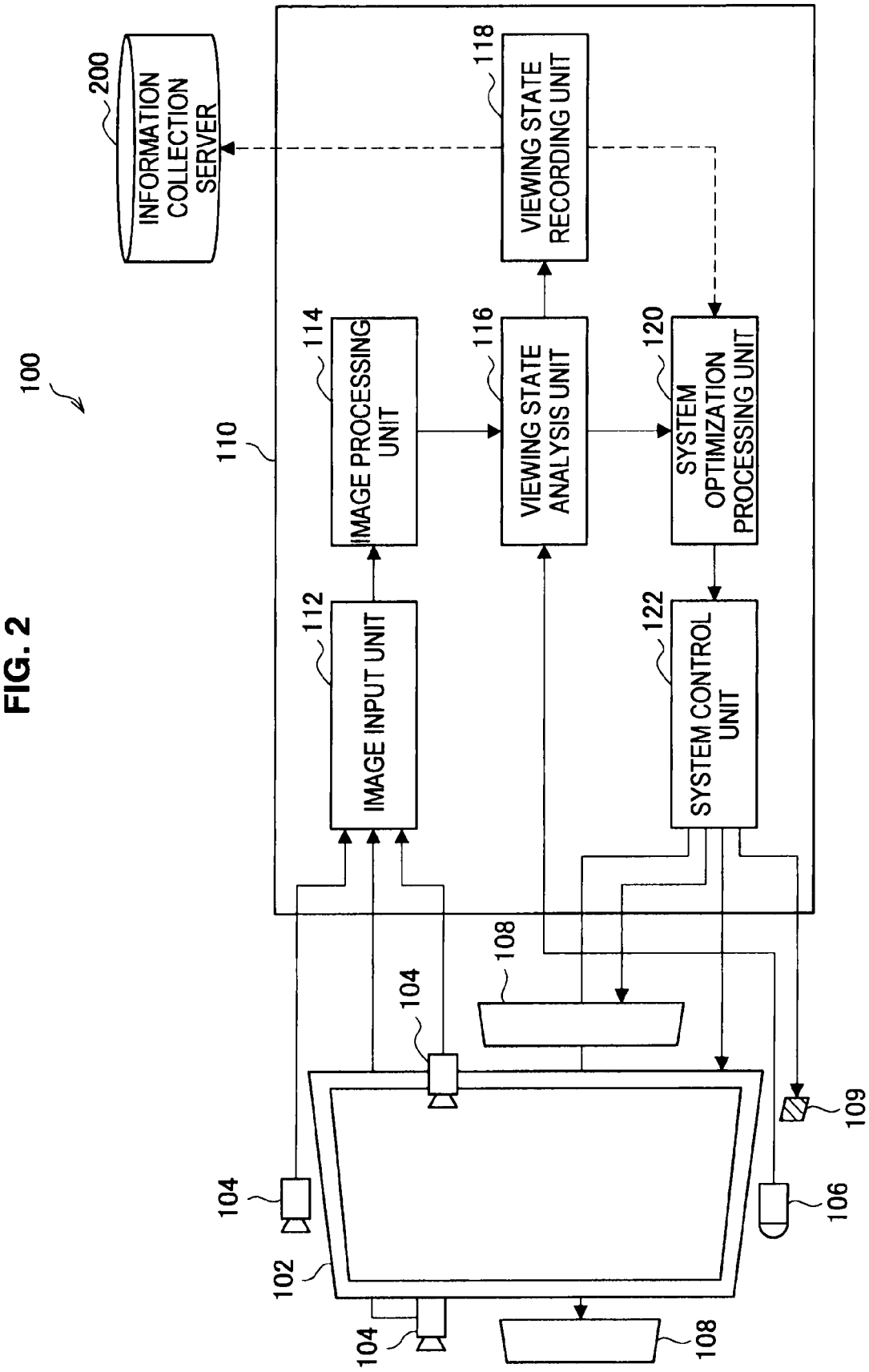
FIG. 2 is an explanation diagram illustrating a configuration of the image display device 100 according to an embodiment of the present invention.

FIG. 2 is an explanation view illustrating a configuration of the image display device 100 according to an embodiment of the present invention. A configuration of the image display device 100 according to an embodiment of the present invention will be described below with reference to FIG. 2.

As illustrated in FIG. 2, the image display device 100 according to an embodiment of the present invention includes the display panel 102, the imaging unit 104, the sensor 106, a speaker 108, and a control unit 110.

The control unit 110 includes an image input unit 112, an image processing unit 114, a viewing state analysis unit 116, a viewing state recording unit 118, a system optimization processing unit 120, and a system control unit 122.

The display panel 102 displays a still image or a moving image based on a panel drive signal. In the present embodiment, the display panel 102 displays the still image or the moving image through a liquid crystal. Of course, it should be understood that the present invention is not limited to the example. The display panel 102 may display the still image or the moving image by a display device of a light-emitting type such as an organic electroluminescence (EL).

The imaging unit 104 is disposed in the upper central part and the left and right central parts of the display panel 102 that displays the still image or the moving image as described above. When the panel drive signal is supplied to the display panel 102 and the moving image is displayed on the display panel 102, the imaging unit 104 acquires the moving image in a direction in which the image display device 100 displays the moving image through the display panel 102. The imaging unit 104 may capture the moving image by a charge coupled device (CCD) sensor or a complementary metal oxide semiconductor (CMOS) sensor. The moving image captured by the imaging unit 104 is transmitted to the control unit 110.

The sensor 106 is displayed in the lower central part of the display panel 102 that displays the still image or the moving image as described above. The sensor 106 detects whether or not a person is present in front of the image display device 100. Further, when a person is present in front of the image display device 100, the sensor 106 can detect the distance between the image display device 100 and the person. The detection result and the distance information obtained by the sensor 106 are transmitted to the control unit 110. The speaker 108 outputs a voice based on a voice output signal.

The control unit 110 controls an operation of the respective components of the image display device 100. The respective components of the control unit 110 will be described below.

The image input unit 112 receives the moving image captured by the imaging unit 104. The moving image received through the image input unit 112 is transmitted to the image processing unit 114 and used for image processing performed by the image processing unit 114.

The image processing unit 114 is an example of an image analysis unit of the present invention and executes a variety of image processing on the moving image, which is captured by the imaging unit 104, received from the image input unit 112. The image processing executed by the image processing unit 114 includes a detection process of a moving body included in the moving image captured by the imaging unit 104, a detection process of the number of people included in the moving image, and a detection process of a face and a facial expression included in the moving image. A result of a variety of image processing performed by the image processing unit 114 is transmitted to the viewing state analysis unit 116 and used for analysis on the presence of a person who is viewing the image display device 100 or a state of a person who is viewing the image display device 100.

For example, the image processing unit 114 may use a technique disclosed in Japanese Patent Application Laid-Open (JP-A) Nos. 2007-65766 and 2005-44330 for the face detection process of detecting the face included in the image. The face detection process will be simply described below.

In order to detect the user's face from the image, the position of the face, the size of the face, and a direction of the face in the supplied image are detected, respectively. When the position and the size of the face are detected, a face image part can be cut from the image. Feature parts (facial feature positions) of the face such as an eyebrow, an eye, a neck, a nose, and a mouse are detected based on the cut face image and information of the direction of the face. The facial feature positions may be detected by detecting the feature positions, for example, using a technique called active appearance models (AAM).

When the facial feature positions are detected, a local feature quantity is calculated on each of the detected facial feature positions. The local feature quantity is calculated, and the calculated local feature quantity is stored in conjunction with the face image, and thus the face can be distinguished from the image captured by the imaging unit 104. As the face distinguishing method, for example, a technique disclosed in JP-A Nos. 2007-65766 and 2005-44330 may be used, and thus a detailed description thereof will be omitted. Further, it can be judged based on the face image or the facial feature positions whether a face appearing in the supplied image is a man or a woman or whether a face appearing in the supplied image is an adult or a child. Further, since face information is previously recorded, it is possible to search for a person appearing in the supplied image from recorded faces and specify an individual.

The viewing state analysis unit 116 receives the result of the various image processing performed by the image processing unit 114 and the detection result and the distance information obtained by detection of the sensor 106. The viewing state analysis unit 116 analyzes the presence or a state of a person who is viewing the image displayed by the image display device 100 using the result of the various image processing performed by the image processing unit 114 and the detection result and the distance information obtained by detection of the sensor 106. Since the viewing state analysis unit 116 analyzes the presence of a person or a state of a viewer, the image display device 100 can decrease brightness of the display panel 102 or control the direction of the display panel 102 depending on whether or not a person who is viewing the image display device 100 is present. An analysis result of the analysis process performed by the viewing state analysis unit 116 is transmitted to the viewing state recording unit 118 and the system optimization processing unit 120.

Further, the viewing state analysis unit 116 can detect the moving body based on the detection result and the distance information obtained by detection of the sensor 106, but when the distance between the sensor 106 and the moving body is equal to or more than a predetermined distance, the moving body can be excluded from a detection target.

The viewing state recording unit 118 records the analysis result obtained by the analysis process performed by the viewing state analysis unit 116. The analysis result of the viewing state analysis unit 116 recorded in the viewing state recording unit 118 is used for a system optimization process in the system optimization processing unit 120. Further, the analysis result of the viewing state analysis unit 116 recorded in the viewing state recording unit 118 may be transmitted to an external information collection server 200.

The system optimization processing unit 120 is an example of a power control unit of the present invention. The system optimization processing unit 120 calculates system control information for executing the system optimization process on the respective components of the image display device 100 using the analysis result obtained by the analysis process of the viewing state analysis unit 116. The system optimization process on the respective components of the image display device 100 includes power control of the image display device 100, brightness control of the display panel 102, direction control of the display panel 102, display content control of the display panel 102, sound volume control of a voice output from the speaker 108, and operation control of a circuitry (not shown) configured to increase the image quality of the moving image displayed on the display panel 102.

As the circuitry configured to increase the image quality of the moving image displayed on the display panel 102, for example, a speed increasing circuit that increases a frame rate twice, three times, or the like may be used. Power consumption of the image display device 100 may be controlled by stopping a part or all of a circuit operation of the circuitry configured to increase the image quality of the moving image such as the speed increasing circuit.

The image display device 100 can execute a power save process based on the system control information calculated by the system optimization processing unit 120. The system control information calculated by the system optimization processing unit 120 is transmitted to the system control unit 122.

Further, the image display device 100 according to the present embodiment executes a power save operation according to a plurality of power save modes which will be described later. In each power save mode, the power save operation is executed based on the system control information that is created, by the system optimization processing unit 120, to have a different pattern according to the analysis result of the viewing state analysis unit 116.

The system control unit 122 executes the system optimization process on the respective components of the image display device 100 based on the system control information calculated by the system optimization processing unit 120. Specifically, the system control unit 122 executes brightness control of the display panel 102, direction control of the display panel 102, display content control of the display panel 102, and sound volume control of the voice output from the speaker 108 based on the system control information calculated by the system optimization processing unit 120.

A configuration of the image display device 100 according to an embodiment of the present invention has been described above with reference to FIG. 2. As described above, the image display device 100 according to an embodiment of the present invention analyzes the user's viewing state through the imaging unit 104 and the sensor 106. In the conventional art, the imaging process is performed by the imaging unit 104, and the user's viewing state is analyzed only through the face detection process that judges whether or not a face is included in the image captured by the imaging unit 104. However, when the user's viewing state is analyzed only through the face detection process, there has been a problem in that even when it is desired to continuously view the display device, for example, when it is difficult to detect the user's face or when the user looks away during a certain time period, it is ultimately judged that viewing is not present, and thus the display is turned off. Further, since the face detection process requires a relatively long image processing time compared to the moving body detection process using the sensor or the like, in an environment in which a computation rate or a resource is restricted, a response from when the user comes in front of the display device for viewing to when the image is displayed has been delayed.

Meanwhile, there is a display device in which power save control is performed by detecting the moving body or the user's action through a pyroelectric infrared element or other sensors and analyzing the user's viewing state. However, there has been a problem in that when the user keeps viewing without moving, it is judged that the user is not present, and thus the screen display is turned off. In order to avoid such a malfunction, it is necessary to increase a time until the power save control starts, which in turn deteriorates a power save effect.

The image display device 100 according to an embodiment of the present invention combines the face detection process on the image captured by the imaging unit 104 and the moving body detection process performed by the sensor 106. Thus, the user's viewing state can be more effectively analyzed.

Next, a configuration of the control unit 110 included in the image display device 100 according to an embodiment of the present invention will be described in detail.

[1-2. Configuration of Control Unit]

Figure 3:
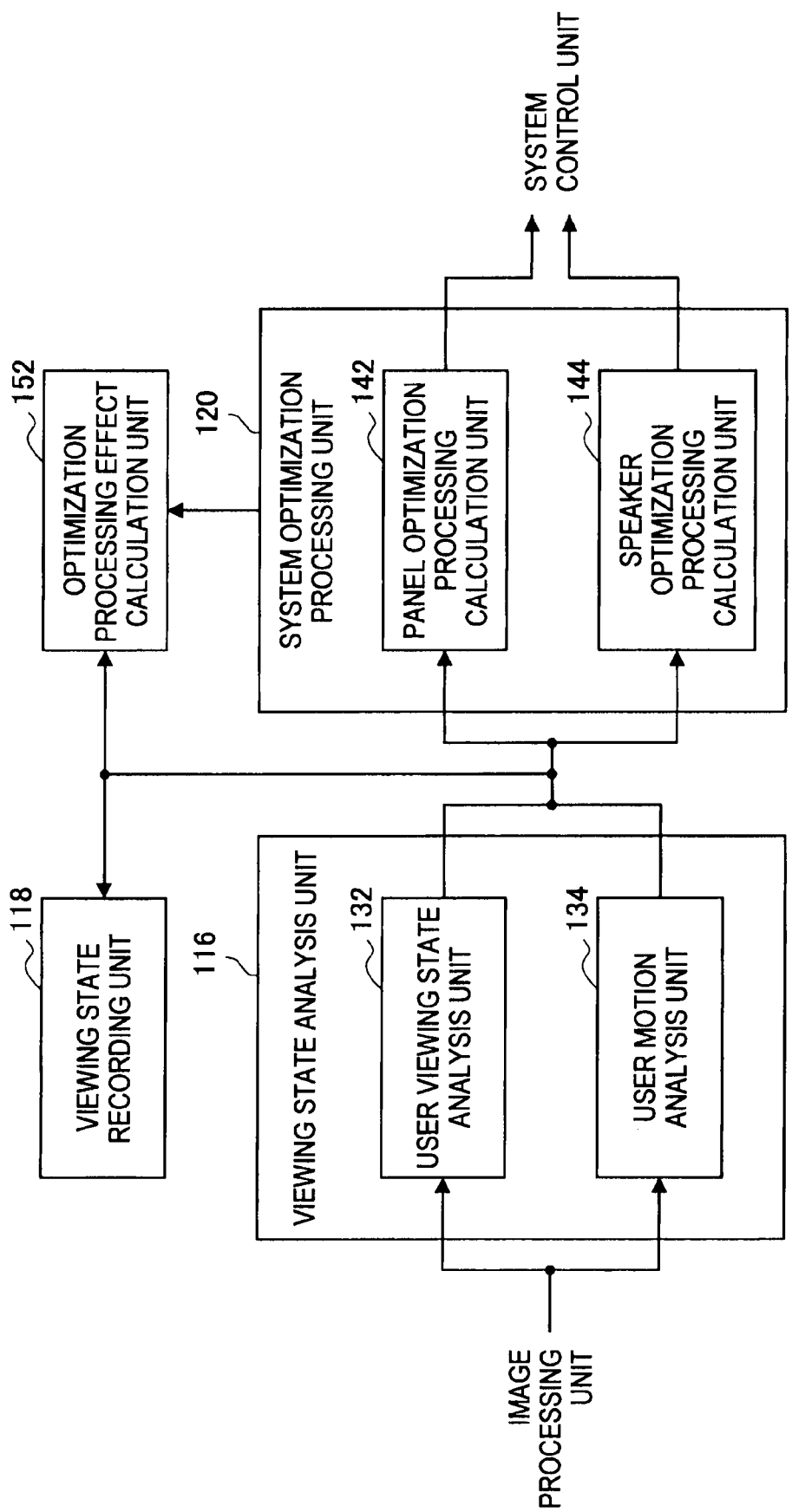
FIG. 3 is an explanation diagram for explaining a configuration of a control unit 110.

FIG. 3 is an explanation view for explaining a configuration of the control unit 110 included in the image display device 100 according to an embodiment of the present invention. Particularly, FIG. 3 illustrates configurations of the viewing state analysis unit 116 and the system optimization processing unit 120 among the components included in the control unit 110. The configurations of the viewing state analysis unit 116 and the system optimization processing unit 120 will be described below with reference to FIG. 3.

As illustrated in FIG. 3, the viewing state analysis unit 116 includes a user viewing state analysis unit 132 and a user motion analysis unit 134. The system optimization processing unit 120 includes a panel optimization processing calculation unit 142 and a speaker optimization processing calculation unit 144.

The user viewing state analysis unit 132 receives the result of the various image processing performed by the image processing unit 114, and the detection result and the distance information obtained by detection of the sensor 106. The user viewing state analysis unit 132 detects whether or not a person who is viewing the image display device 100 is present, and a direction or a size of a face of a person who is viewing the image display device 100 using the result of the various image processing performed by the image processing unit 114, and the detection result and the distance information obtained by detection of the sensor 106.

The user motion analysis unit 134 receives the result of the various image processing performed by the image processing unit 114, and the detection result and the distance information obtained by detection of the sensor 106. The user motion analysis unit 134 analyzes whether or not a person who is viewing the image display device 100 is present, based on time-series or special state or record of the user's motion, using the result of the various image processing performed by the image processing unit 114, and the detection result and the distance information obtained by detection of the sensor 106.

Here, the image processing unit 114 transmits the captured image, face detection information (for example, information such as central coordinates [a1,b1], the size of a face [w1,h1], and a direction of a face [i1]) of each user who is using the image display device 100 in the captured image, and moving body information (for example, information such as central coordinates [c1,d1], the size of a facial area [s1]) to the viewing state analysis unit 116. The viewing state analysis unit 116 performs the analysis process on whether or not a person who is viewing the image display device 100 is present using the information received from the image processing unit 114 through the user viewing state analysis unit 132 and the user motion analysis unit 134.

The panel optimization processing calculation unit 142 calculates a process (a power save implementation process) capable of implementing optimum power save in the display panel 102 using the result of the analysis process performed by the user viewing state analysis unit 132 and the user motion analysis unit 134. For example, the process capable of implementing optimum power save in the display panel 102 may include a process of controlling power consumption by increasing or decreasing brightness of the display panel 102 according to whether or a person who is viewing the image display device 100 is present and a time in which a person who is viewing the image display device 100 is not present, or controlling power consumption by increasing or decreasing the sound volume of the voice output from the speaker 106. The power save implementation process calculated by the panel optimization processing calculation unit 142 is transmitted to the system control unit 122 and used in the power save process of the display panel 102.

The speaker optimization processing calculation unit 144 calculates a process (a power save implementation process) capable of implementing optimum power save in the speaker 108 using the result of the analysis process performed by the user viewing state analysis unit 132 and the user motion analysis unit 134. For example, the process capable of implementing optimum power save in the speaker 108 may include a process of controlling a sound volume of the speaker 108 according to whether or a person who is viewing the image display device 100 is present and a time in which a person who is viewing the image display device 100 is not present. The power save implementation process calculated by the speaker optimization processing calculation unit 144 is transmitted to the system control unit 122 and used in the power save process of the speaker 108.

Further, for calculation of the power wave implementation process in the system optimization processing unit 120, an optimization processing effect calculation unit 152 may be used. The optimization processing effect calculation unit 152 calculates control information for the optimum power save process corresponding to the user's viewing state using the analysis result of the viewing state analysis unit 116 and the calculation result of the power save implementation process performed by the system optimization processing unit 120.

The configuration of the control unit 110 included in the image display device 100 according to an embodiment of the present invention has been described with reference to FIG. 3. Next, the power save process performed by the image display device 100 according to an embodiment of the present invention will be described.

[1-3. Power Save Process]

Figure 4:
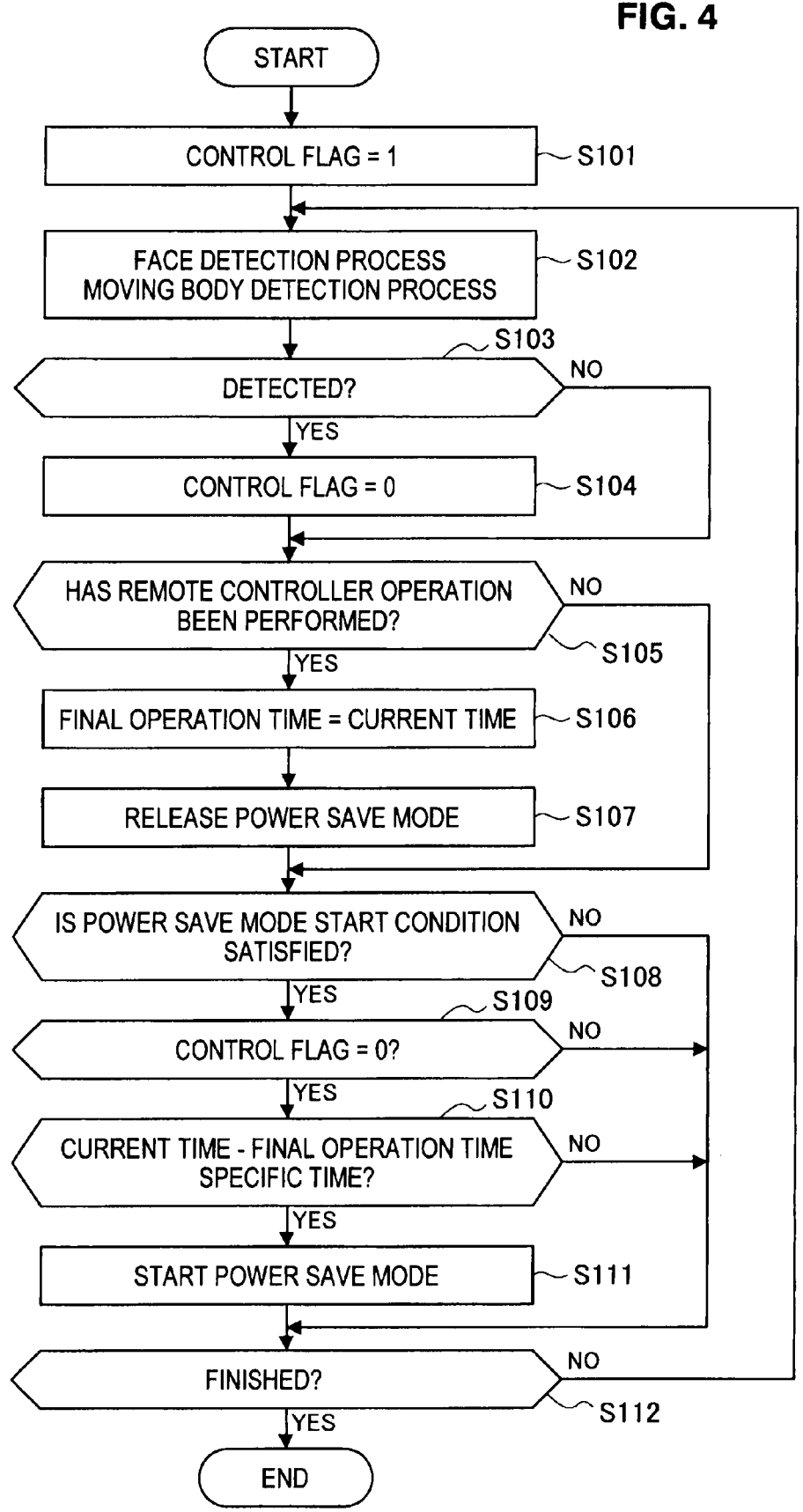
FIG. 4 is a flowchart illustrating an example of a power save process performed by the image display device 100 according to an embodiment of the present invention.

FIG. 4 is a flowchart illustrating the power save process performed by the image display device 100 according to an embodiment of the present invention. The power save process performed by the image display device 100 according to an embodiment of the present invention will be described below with reference to FIG. 4.

The flowchart illustrated in FIG. 4 illustrates an example of a transition process to a mode (a power save mode) of suppressing power consumption of the image display device 100. A transition process to the power save mode by the image display device 100 according to an example of the present invention will be described below in detail. When the image display device 100 is powered on, the system optimization processing unit 120 sets a control flag to one (1) (step S101). The control flag is a flag for deciding whether or not the power save mode is to be executed in the image display device 100. The power save mode is not executed when the flag is 1, but when the flag is zero (0), the power save mode is executed. The viewing state analysis unit 116 performs the face detection process and the moving body detection process to judge whether or not a person who is viewing the image display device 100 is present (step S102).

The viewing state analysis unit 116 judges whether or not the presence of a person who is viewing the image display device 100 has been detected as a result of the face detection process and the moving body detection process of step S102 (step S103). When it is judged in step S103 that the viewing state analysis unit 116 has detected the presence of a person who is viewing the image display device 100, the system optimization processing unit 120 sets the control flag to 0 (step S104). However, when it is judged in step S103 that the viewing state analysis unit 116 has not detected the presence of a person who is viewing the image display device 100, the control flag remains as 1.

Subsequently, it is judged whether or not the user has performed an operation on the image display device 100 through the remote controller for operating the image display device 100 (step S105). The operation judgment may be executed by the viewing state analysis unit 116.

When it is judged in step S105 that the user has performed an operation on the image display device 100 through the remote controller, information of a final operation time retained in the image display device 100 is set to a current time (step S106). Setting the information of the final operation time to the current time may be performed, for example, by the viewing state analysis unit 116.

When information of the final operation time retained in the image display device 100 is set to the current time in step S106, the system optimization processing unit 120 releases the power save mode (step S107).

However, when it is judged in step S105 that the user has not performed an operation on the image display device 100 through the remote controller, step S106 and step S107 are skipped.

Subsequently, the system optimization processing unit 120 judges whether or not a power save mode start condition is satisfied (step S108). The power save mode start condition depends on the power save mode designated by the user. An example of the power save mode start condition in the image display device 100 according to an embodiment of the present invention will be described below, but it should be understood that the number of power save modes and the power save mode start condition of each power save mode are not limited to the example.

The image display device 100 according to an embodiment of the present invention has three kinds of power save modes including "High," "Medium," and "Low." The system optimization processing unit 120 calculates the system control information corresponding to each power save mode, and the system control unit 122 executes a variety of control based on the calculated system control information. Thus, power consumption of the respective components of the image display device 100 can be controlled with different patterns.

"High" is a power save mode in which when the viewing state analysis unit 116 has not recognized the face during a specific time period, transition to a power save operation of suppressing power consumption is performed.

"Medium" is a power save mode in which when the viewing state analysis unit 116 has not recognized the face during a specific time period, transition to a power save operation of suppressing power consumption is performed, and when the viewing state analysis unit 116 has not recognized the face and the moving body during a specific time period, transition to a power save operation of suppressing power consumption is further performed.

"Low" is a power save mode in which when the viewing state analysis unit 116 has not recognized the face and the moving body during a specific time period, transition to a power save operation of suppressing power consumption is performed.

Figure 5:
FIG. 5 is an explanation diagram for explaining a power save operation in respective power save modes in the image display device 100 according to an embodiment of the present invention.

FIG. 5 is an explanation diagram for explaining the power save operation in the respective power save modes in the image display device 100 according to an embodiment of the present invention. A graph illustrated in the uppermost row of FIG. 5 represents patterns of face detection and moving body detection chronologically. In the other graphs of FIG. 5, a horizontal axis denotes time, and a vertical axis denotes power consumption.

As illustrated in FIG. 5, when the power save mode is "High," if the viewing state analysis unit 116 cannot recognize the face during a specific time (for example, between 3 seconds and 10 seconds), power consumption is steadily suppressed, for example, by decreasing the brightness of the display panel 102 or decreasing the sound volume of the speaker 108. However, when the viewing state analysis unit 116 can recognize the face or when an operation on the image display device 100 has been performed by the remote controller, the power save mode is released.

Further, when the power save mode is "Middle," if the viewing state analysis unit 116 cannot recognize the face during a specific time (for example, between 10 seconds and 30 seconds), power consumption is steadily suppressed up to about half, for example, by decreasing the brightness of the display panel 102 or decreasing the sound volume of the speaker 108. Further, if the viewing state analysis unit 116 cannot recognize the face and the moving body during a specific time (for example, between 1 minute and 3 minutes), power consumption is further suppressed, for example, by decreasing the brightness of the display panel 102 or decreasing the sound volume of the speaker 108. However, when the viewing state analysis unit 116 can recognize the face or when an operation on the image display device 100 has been performed by the remote controller, the power save mode is released.

Further, when the power save mode is "Low," if the viewing state analysis unit 116 cannot recognize the face and the moving body during a specific time (for example, between 3 minutes and 10 minutes), power consumption is steadily suppressed, for example, by decreasing the brightness of the display panel 102 or decreasing the sound volume of the speaker 108. However, when the viewing state analysis unit 116 can recognize the face or when an operation on the image display device 100 has been performed by the remote controller, the power save mode is released.

FIG. 5 illustrates the power save operation in the respective power save modes using two patterns of face detection and moving body detection. A pattern illustrated in a middle column of FIG. 5 illustrates a case in which the moving body is not detected after the face has not been detected, the moving body is detected, and the face is detected after the detection. The pattern is referred to as "pattern 1." Further, a pattern illustrated at the right of FIG. 5 illustrates a case in which the face is detected again after the face had not been detected, the face is not detected again, the moving body is not detected again, the face is first detected, and then the moving body is detected. The pattern is referred to as "pattern 2."

If the power save mode is "High," since transition to the power save mode is performed only according to whether or not the face is present, a power save operation illustrated in a graph of a second step from the top of FIG. 5 is performed on each of the case of pattern 1 and the case of pattern 2. If the power save mode is "Medium," since power consumption is suppressed by first performing transition to the power save mode according to whether or not the face is present and then further suppressing power consumption according to whether or not the moving body is present, a power save operation illustrated in a graph of a third step from the top of FIG. 5 is performed on each of the case of pattern 1 and the case of pattern 2. If the power save mode is "Low," since power consumption is suppressed by first performing transition to the power save mode according to whether or not the face and the moving body are present, a power save operation illustrated in a graph of a fourth step from the top of FIG. 5 is performed on each of the case of pattern 1 and the case of pattern 2.

When the system optimization processing unit 120 judges that the power save mode start condition is satisfied in step S108, the system optimization processing unit 120 judges whether or not the control flag is 0 (step S109).

When the system optimization processing unit 120 judges that the control flag is 0 in step S109, the system optimization processing unit 120 judges whether or not a time obtained by subtracting the final operation time set in step S106 from the current time has exceeded a specific time (step S110). For example, in the case in which the power save mode of the image display device 100 is set to "High," the system optimization processing unit 120 judges whether or not the time obtained by subtracting the final operation time set in step S106 from the current time has exceeded 10 seconds.

When the system optimization processing unit 120 judges that the time obtained by subtracting the final operation time set in step S106 from the current time has exceeded the specific time in step S110, the image display device 100 starts the power save mode (step S111). For example, in the case in which the power save mode of the image display device 100 is set to "High," if the time obtained by subtracting the final operation time set in step S106 from the current time has exceeded 10 seconds, the image display device 100 starts the power save mode, and decreases the brightness of the display panel 102 or decreases the sound volume of the speaker 108 to steadily suppress power consumption.

After transition to the power save mode is performed in step S111, when the system optimization processing unit 120 judges that the power save mode start condition is not satisfied in step S108, when the system optimization processing unit 120 judges that the control flag is not 0 in step S109, or when the system optimization processing unit 120 judges that a time obtained by subtracting the final operation time from the current time has not exceeded the specific time in step S110, it is judged whether or not an operation of the image display device 100 has been finished, for example, because power is turned off (step S112). If the operation of the image display device 100 has been finished, the process is finished as is. However, if the operation of the image display device 100 has not been finished, the process returns to step S102, and execution of the face detection process and the moving body detection process is continued by the viewing state analysis unit 116.

The power save process performed by the image display device 100 according to an embodiment of the present invention has been described above with reference to FIG. 4. Next, the power save operation of each power save mode in the image display device 100 according to an embodiment of the present invention will be described.

Figure 6:
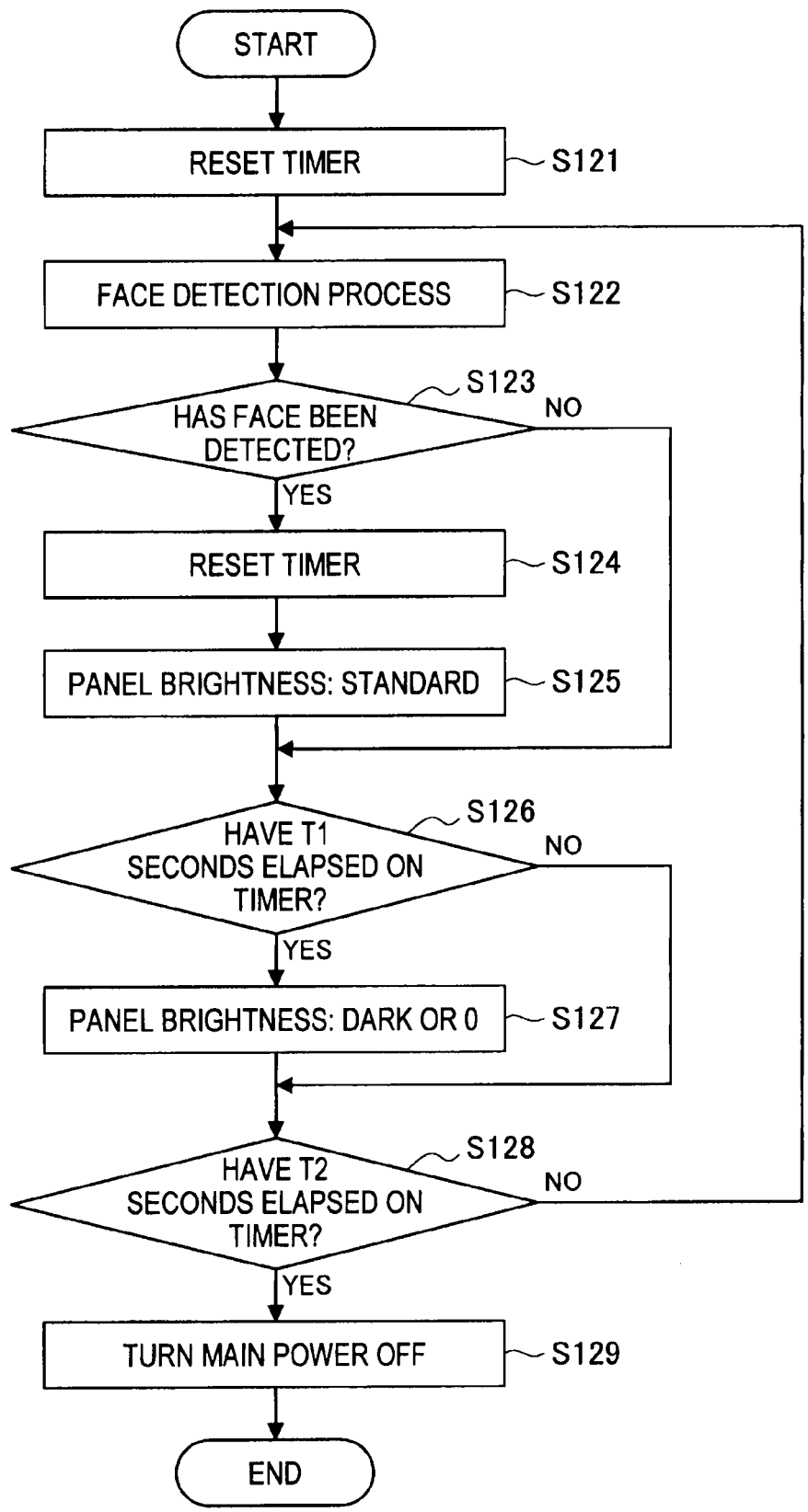
FIG. 6 is a flowchart illustrating a power save operation of the image display device 100.

FIG. 6 is a flowchart illustrating the power save operation when the power save mode in the image display device 100 according to an embodiment of the present invention is "High." The power save operation when the power save mode in the image display device 100 according to an embodiment of the present invention is "High" will be described below with reference to FIG. 6.

First, a timer retained in the image display device 100 is reset in advance before starting the power save operation (step S121). For example, resetting of the timer in step S121 may be executed by the viewing state analysis unit 116.

Subsequently, the viewing state analysis unit 116 executes the face detection process (step S122). The viewing state analysis unit 116 judges whether or not a human face is included in the image transmitted to the image input unit 112 as a result of executing the face detection process through the viewing state analysis unit 116 (step S123).

When the viewing state analysis unit 116 judges that a human face is included in the image transmitted to the image input unit 112 in step S123, the timer retained in the image display device 100 is reset again (step S124). For example, resetting of the timer in step S124 may be executed by the viewing state analysis unit 116 similarly to resetting of the timer in step S121.

When the timer is reset in step S124, the system optimization processing unit 120 sets the brightness of the display panel 102 to standard brightness (brightness at the time of ordinary use) (step S125).

However, when the viewing state analysis unit 116 judges that a human face is not included in the image transmitted to the image input unit 112 in step S123, the system optimization processing unit 120 judges whether or not T1 seconds (for example, 10 seconds) have elapsed on the timer (step S126).

When the system optimization processing unit 120 judges that T1 seconds have elapsed on the timer in step S126, the system optimization processing unit 120 sets the brightness of the display panel 102 to be dark or zero (0) (step S127).

When the system optimization processing unit 120 sets the brightness of the display panel 102 to be zero or darkest in step S127 or when the system optimization processing unit 120 judges that T1 seconds have not elapsed on the timer yet in step S126, the system optimization processing unit 120 judges whether or not T2 seconds have elapsed on the timer (here, T2>T1) (step S128).

When the system optimization processing unit 120 judges that T2 seconds have elapsed on the timer in step S128, the system optimization processing unit 120 executes a process of turning main power of the image display device 100 off (step S129). However, when the system optimization processing unit 120 judges that T2 seconds have not elapsed on the timer in step S128, the process returns to step S122, and the face detection process is continued by the viewing state analysis unit 116.

The power save operation when the power save mode in the image display device 100 according to an embodiment of the present invention is "High" has been described above with reference to FIG. 6. Next, the power save operation when the power save mode in the image display device 100 according to an embodiment of the present invention is "Medium" will be described.

FIG. 7 is a flowchart illustrating the power save operation when the power save mode in the image display device 100 according to an embodiment of the present invention is "Medium." The power save operation when the power save mode in the image display device 100 according to an embodiment of the present invention is "Medium" will be described below with reference to FIG. 7.

First, two timers (hereinafter, for convenience of description, the two timers are referred to as timers 1 and 2, respectively) retained in the image display device 100 are reset in advance before starting the power save operation (step S131). For example, resetting of the timers 1 and 2 in step S121 may be executed by the viewing state analysis unit 116. The timer 1 measures a time in which the viewing state analysis unit 116 has not detected the face, and the timer 2 measures a time in which the viewing state analysis unit 116 has not detected the presence of the moving body.

Subsequently, the viewing state analysis unit 116 executes the face detection process and the moving body detection process (step S132). The viewing state analysis unit 116 judges whether or not a human face is included in the image transmitted to the image input unit 112 as a result of executing the face detection process through the viewing state analysis unit 116 (step S133).

When the viewing state analysis unit 116 judges that a human face is included in the image transmitted to the image input unit 112 in step S133, the timers 1 and 2 retained in the image display device 100 are reset again (step S134). For example, resetting of the timers in step S134 may be executed by the viewing state analysis unit 116 similarly to resetting of the timers in step S131.

When the timers are reset in step S134, the system optimization processing unit 120 sets the brightness of the display panel 102 to standard brightness (brightness at the time of ordinary use) (step S135).

However, when the viewing state analysis unit 116 judges that a human face is not included in the image transmitted to the image input unit 112 in step S133, the viewing state analysis unit 116 judges whether or not the sensor 106 has detected the moving body (step S136).

When the viewing state analysis unit 116 judges that the sensor 106 has detected the moving body in step S136, the timer 2 is reset (step S137). For example, resetting of the timer 2 in step S137 may be executed by the viewing state analysis unit 116 similarly to resetting of the timers in step S131 and step S134.

When the timer 2 is reset in step S137, it is judged whether or not the brightness of the display panel 102 is zero (0) (step S138). For example, the judgment on the brightness of the display panel 102 may be executed by the system optimization processing unit 120.

When the system optimization processing unit 120 judges that the brightness of the display panel 102 is zero in step S138, the system optimization processing unit 120 regards that the user is in front of the image display device 100 but the user's face is not facing the direction of the display panel. Thus, the system optimization processing unit 120 calculates the system control information for performing control to lower the brightness of the display panel 102 and lowers the brightness of the display panel 102 (step S139).

Subsequently, the system optimization processing unit 120 judges whether or not T3 seconds (for example, 30 seconds) have elapsed on the timer 1 and T4 seconds (for example, 180 seconds), which is longer than T3 seconds, have not elapsed on the timer 2 yet (step S140).

When the system optimization processing unit 120 judges whether or not T3 seconds have elapsed on the timer 1 and T4 seconds have not elapsed on the timer 2 yet in step S140, the system optimization processing unit 120 regards that the user is in front of the image display device 100 but the user's face is not facing the direction of the display panel. Thus, the system optimization processing unit 120 calculates the system control information for performing control to lower the brightness of the display panel 102 and lowers the brightness of the display panel 102 (step S141).

However, when the system optimization processing unit 120 judges that T3 seconds have not elapsed on the timer 1 yet in step S140, the system optimization processing unit 120 skips step S141.

Subsequently, the system optimization processing unit 120 judges whether or not T4 seconds have elapsed on the timer 2 (step S142). When the system optimization processing unit 120 judges that T4 seconds have elapsed on the timer 2 in step S142, the system optimization processing unit 120 regards that the user is not in front of the image display device 100. Thus, the system optimization processing unit 120 calculates the system control information for performing control to bring the brightness of the display panel 102 to zero and brings the brightness of the display panel 102 to zero (step S143).

However, when the system optimization processing unit 120 judges that T4 seconds have not elapsed on the timer 2 yet in step S142, the system optimization processing unit 120 skips step S142.

Subsequently, the system optimization processing unit 120 judges whether or not T5 seconds, which is longer than T4 seconds, have elapsed on the timer 2 (step S144). When the system optimization processing unit 120 judges that T5 seconds, which is longer than T4 seconds, have elapsed on the timer 2 in step S144, the system optimization processing unit 120 regards that the user is not in front of the image display device 100. Thus, the system optimization processing unit 120 executes a process of turning main power of the image display device 100 off (step S145). However, when the system optimization processing unit 120 judges that T5 seconds, which is longer than T4 seconds, have not elapsed on the timer 2 in step S144, the process returns to step S132, and the face detection process and the moving body detection process are continued by the viewing state analysis unit 116.

The power save operation when the power save mode in the image display device 100 according to an embodiment of the present invention is "Medium" has been described above with reference to FIG. 7. Next, the power save operation when the power save mode in the image display device 100 according to an embodiment of the present invention is "Low" will be described.

Figure 8:
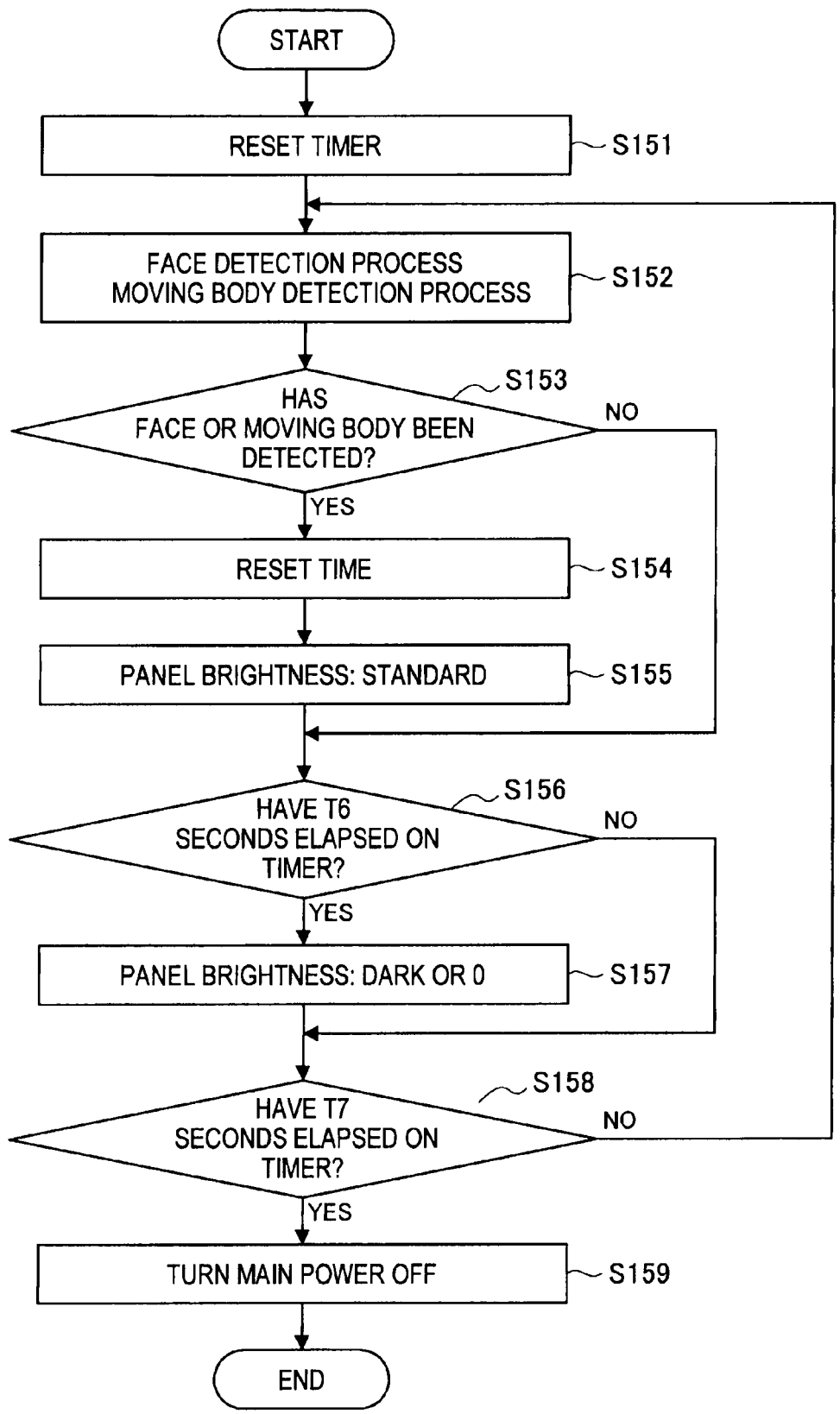
FIG. 8 is a flowchart illustrating a power save operation of the image display device 100.

FIG. 8 is a flowchart illustrating the power save operation when the power save mode in the image display device 100 according to an embodiment of the present invention is "Low." The power save operation when the power save mode in the image display device 100 according to an embodiment of the present invention is "Low" will be described below with reference to FIG. 8.

First, a timer retained in the image display device 100 is reset in advance before starting the power save operation (step S151). For example, resetting of the timer in step S151 may be executed by the viewing state analysis unit 116.

Subsequently, the viewing state analysis unit 116 executes the face detection process and the moving body detection process (step S152). The viewing state analysis unit 116 judges whether or not the face or the moving body has been detected, that is, a person is in front of the image display device 100, as a result of executing the face detection process and the moving body detection process through the viewing state analysis unit 116 (step S153).

When the viewing state analysis unit 116 judges that the face or the moving body has been detected in step S153, the timer retained in the image display device 100 is reset again (step S154). For example, resetting of the timer in step S154 may be executed by the viewing state analysis unit 116 similarly to resetting of the timer in step S151.

When the timer retained in the image display device 100 is reset in step S154, the system optimization processing unit 120 sets the brightness of the display panel 102 to standard brightness (brightness at the time of ordinary use) (step S155).

However, when the viewing state analysis unit 116 judges that the face and the moving body have not been detected in step S153, the system optimization processing unit 120 judges whether or not T6 seconds (for example, 600 seconds) have elapsed on the timer (step S156).

When the system optimization processing unit 120 judges that T6 seconds have elapsed on the timer in step S156, the system optimization processing unit 120 sets the brightness of the display panel 102 to be dark or zero (0) (step S157).

When the system optimization processing unit 120 sets the brightness of the display panel 102 to be zero or darkest in step S157 or when the system optimization processing unit 120 judges that T7 seconds have not elapsed on the timer yet in step S156, the system optimization processing unit 120 judges whether or not T7 seconds have elapsed on the timer (here, T7>T6) (step S158).

When the system optimization processing unit 120 judges that T7 seconds have elapsed on the timer in step S158, the system optimization processing unit 120 executes a process of turning main power of the image display device 100 off (step S159). However, when the system optimization processing unit 120 judges that T7 seconds have not elapsed on the timer in step S158, the process returns to step S152, and the face detection process and the moving body detection process are continued by the viewing state analysis unit 116.

The power save operation when the power save mode in the image display device 100 according to an embodiment of the present invention is "Low" has been described above with reference to FIG. 8.

<2. Summary>

As described above, according to the image display device 100 according to an embodiment of the present invention, it is judged whether the user is in front of the image display device 100 according to whether or not a human face is included in the image captured by the imaging unit 104 and whether or not the moving body has been detected by the sensor 106. Since the face detection process and the moving body detection process are combined as described above, the presence of the user who is in front of the image display device 100 can be detected with a high degree of accuracy.

Further, according to the image display device 100 according to an embodiment of the present invention, a plurality of power save modes can be implemented by combining the face detection process and the moving body detection process. That is, the image display device 100 according to an embodiment of the present invention can execute the power save mode using only the face detection process and can execute the power save mode in which the face detection process and the moving body detection process are combined. Since a plurality of power save modes can be implemented, it is possible to execute the power save mode suitable for the user's use state of the image display device 100.

Further, a series of processes described above may be implemented by hardware or software. When a series of processes is implemented by software, a program that constitutes the software is installed into a computer integrated in dedicated hardware or a general-purpose personal computer in which a variety of functions can be executed by installing a variety of programs from a program recording medium.

While the preferred embodiments of the present invention have been described above with reference to the accompanying drawings, the present invention is of course not limited to the above examples. A person skilled in the art may find various alterations and modifications within the scope of the appended claims, and it should be understood that they will naturally come under the technical scope of the present invention.

For example, the user's use state may be recorded in the image display device 100 in order, and using a result of learning the user's recorded use state, the system optimization processing unit 120 may automatically select the power save mode from among a plurality of power save modes. An example of an automatic selection process of the power save mode will be described below.

For example, the user may be specified by performing a face recognition process on an image captured by the imaging unit 104, and the system optimization processing unit 120 may automatically select the power save mode for each of the specified users. For example, a power save mode in which image erasing is performed less and the power save effect is low may previously be set to the image display device 100 for a father, and a power save mode in which image erasing is frequently performed and the power save effect is low may previously be set to the image display device 100 for a mother. Depending on whether a person included in the image captured by the imaging unit 104 is the father or the mother, the system optimization processing unit 120 may automatically select the power save mode.

For example, the system optimization processing unit 120 may automatically select the optimum power save mode through analysis on a viewing style of a specific individual. For example, in the case of the user who is more likely to turn on the television for a long time but to view the television less, transition to image erasing is easily performed. However, in the case of the user who is more likely to keep viewing a program for a short time, transition to image erasing becomes difficult to perform. Since it is necessary to record the user's viewing style during a specific time period for analysis of the viewing style, automatic setting cannot be used from the beginning, but upon acquisition of necessary data, an automatic setting option can be effectively used.

Further, for example, a mode may be automatically selected according to content that is being viewed through the image display device 100. For example, when content such as a movie is viewed through the image display device 100, continuous viewing may be treated as a priority, and a time until image erasing may increase. When information different from the content such commercials is provided at a regular interval, a time until image erasing may increase or decrease in the content part and the other parts. Further, information on content that is being viewed through the image display device 100 may be acquired, for example, from data of an electronic program guide (EPG) or may be acquired from a genre of the content currently being viewed, and set to the image display device 100 by the user of the image display device 100.

Further, for example, in view of a situation in which normal image processing cannot be performed due to backlight or shielding or a situation in which a malfunction in which the power save mode starts regardless of whether or not the user views the device occurs, for example, in an environment in which the user views the device outside an angle of view, the system optimization processing unit 120 may not start the power save mode even if the face or the moving body is not detected until at least one face is first detected after the power save process starts.

In order to avoid a malfunction during a time period (or a certain time period thereafter) after the face is detected at least once and the image display device 100 starts the power save mode, and the user is considered to execute an active operation through the remote controller, for example, powering the image display device 100 on or changing the content being displayed on the display panel 102, the system optimization processing unit 120 may not start the power save mode even if the face or the moving body is not detected.

Figure 9:
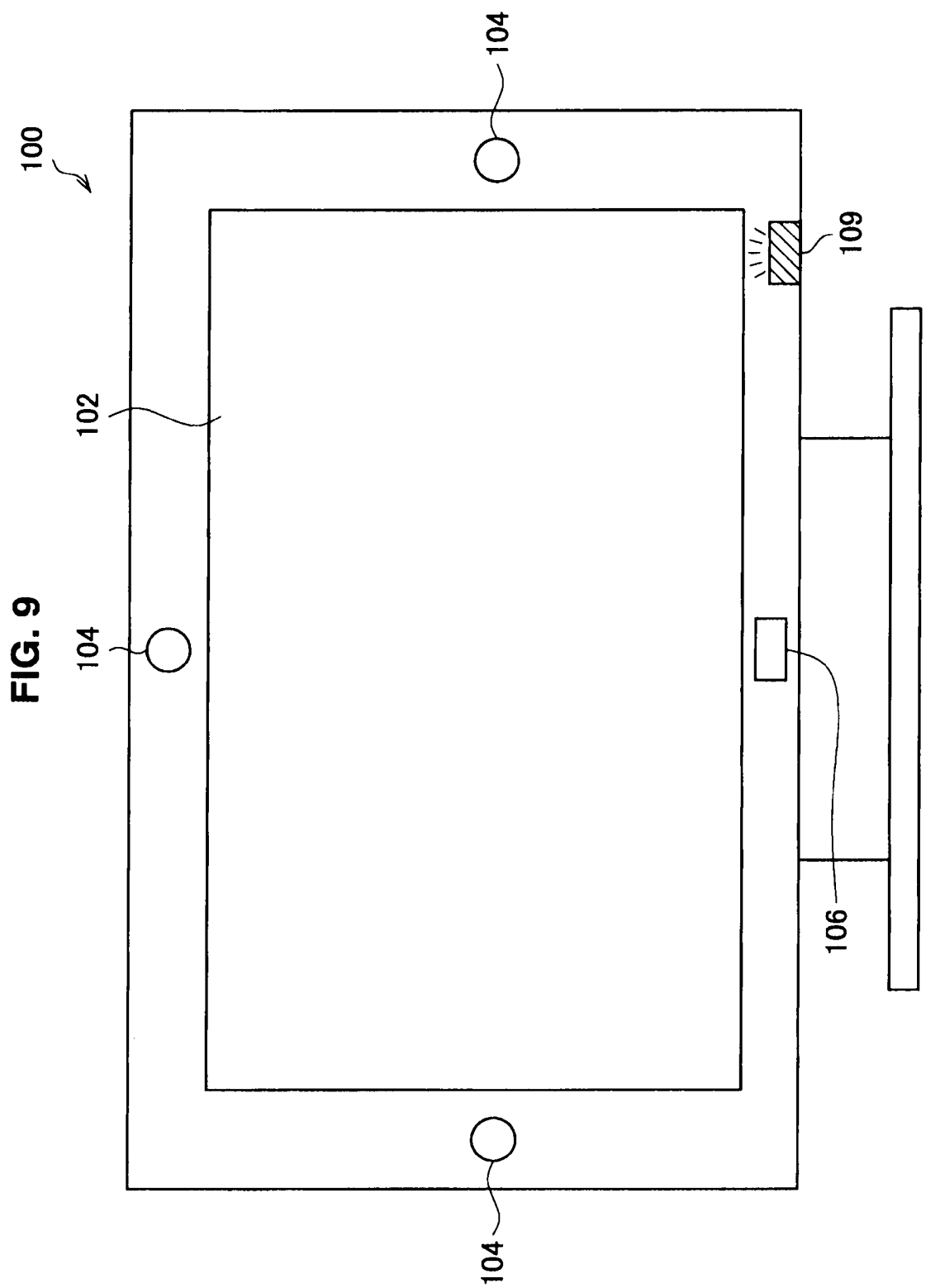
FIG. 9 is an explanation diagram illustrating an operation example of the image display device 100 when a power mode is intentionally being suppressed.

Further, in the case in which the power save mode is intentionally being suppressed, the image display device 100 may notify the user of a suppression status of the power save mode through a state notification means (for example, an LED or a user interface (UI) indication inside a screen) included therein. FIGS. 9 and 10 are explanation diagrams illustrating operation examples of the image display device 100 when the power save mode is intentionally being suppressed. FIG. 9 illustrates an example in which an LED 109 emits light of predetermined color as an indicator representing that the power save mode is being suppressed when the power save mode is intentionally being suppressed. FIG. 10 illustrates an example in which a graphical user interface (GUI) indicator 103 representing that the power save mode is being suppressed is displayed on the display panel 102 when the power save mode is intentionally being suppressed.

REFERENCE SIGNS LIST

100 image display device
102 display panel
104 imaging unit
106 sensor
108 speaker
109 LED
110 control unit
112 image input unit
114 image processing unit 116 viewing state analysis unit
118 viewing state recording unit
120 system optimization processing unit
122 system control unit
132 user viewing state analysis unit
134 user motion analysis unit
142 panel optimization processing calculation unit
144 speaker optimization processing calculation unit
152 optimization processing effect calculation unit

The invention claimed is:

1. A display device, comprising:
a first sensor configured to capture a moving image in a predetermined range in an image display direction;
a second sensor configured to detect, separately from captured moving images, whether or not a moving body is present in the image display direction, the second sensor detecting a distance between the moving body and the display device when the second sensor detects that the moving body is present; and
a circuit connected to the first sensor and the second sensor, and configured to
analyze the moving image to detect whether or not a face is present, and
control power consumption with different patterns according to a plurality of modes based on whether or not the face is present and a detection result from the second sensor indicating whether or not the moving body is present and indicating the distance from the moving body to the display device,
wherein the circuit does not start control of power consumption until the face or the moving body is first detected after power is turned on.

2. The display device according to claim 1, wherein the circuit includes a first mode in which power consumption is controlled only according to whether or not the face is present, and when the circuit has not been able to detect the presence of the face during a predetermined time, power consumption decreases.

3. The display device according to claim 2, wherein the circuit includes a second mode in which power consumption is controlled using whether or not the face is present and whether or not the moving body is present, power consumption decreases up to a predetermined level when the circuit has not been able to detect the presence of the face during a first predetermined time, and, after the decrease, power consumption further decreases when the second sensor has not been able to detect the presence of the moving body during a second predetermined time.

4. The display device according to claim 3, wherein the circuit includes a third mode in which power consumption is controlled using whether or not the face is present and whether or not the moving body is present, and when the circuit has not been able to detect the presence of the face during a predetermined time and the second sensor has not been able to detect the presence of the moving body during the predetermined time, power consumption decreases.

5. The display device according to claim 1, wherein the circuit controls power consumption by increasing or decreasing brightness of a display panel that displays an image.

6. The display device according to claim 1, wherein the circuit controls power consumption by increasing or decreasing a sound volume of a speaker that plays a voice.

7. The display device according to claim 1, wherein the circuit controls power consumption by controlling an operation of a circuit configured to increase an image quality of a display image.

8. The display device according to claim 1, wherein the circuit is further configured to notify that control of power consumption is stopped when the circuit stops control of power consumption.

9. The display device according to claim 1, wherein the circuit specifies an individual through analysis on the moving image, and the circuit automatically selects a mode corresponding to the individual specified.

10. The display device according to claim 1, wherein the circuit automatically selects a mode corresponding to details of content to be displayed.

11. The display device according to claim 1, wherein the circuit is configured to exclude a moving body as a detection target when the distance between the display device and the moving body as determined by the second sensor is more than a predetermined distance.

12. A display device, comprising:
a sensor configured to detect whether or not a moving body is present in a predetermined range in an image display direction and
circuitry configured to
capture a moving image in a predetermined range in the image display direction,
analyze the moving image to detect whether or not a face is present, and
control power consumption with different patterns according to a plurality of modes that are set by determining whether or not the face is present and whether or not the moving body is present,
wherein the circuitry does not start control of power consumption until the face or the moving body is first detected after power is turned on.

13. A control method, comprising:
capturing, using a first sensor, a moving image in a predetermined range in an image display direction;
detecting, in a second sensor and separately from captured moving images, whether or not a moving body is present in the predetermined range in the image display direction;
detecting, in the second sensor, a distance between the moving body and the second sensor;
analyzing the captured moving image to detect whether or not a face is present; and
controlling power consumption with different patterns according to a plurality of modes based on whether or not the face is present and a detection result from the second sensor indicating whether or not the moving body is present and the distance from the moving body to the second sensor,
wherein the control of power consumption does not start until the face or the moving body is first detected after power is turned on.

14. The control method of claim 13, further comprising:
excluding a moving body as a detection target when the second sensor determines the moving body to be more than a predetermined distance from the second sensor in the display direction.

* * * * *